No. 637,450. Patented Nov. 21, 1899.
J. B. DOOLITTLE.
GASOLENE ENGINE.
(Application filed June 28, 1898.)
(No Model.) 5 Sheets—Sheet 1.

WITNESSES:
A. V. Groupe
Walter C. Pusey.

INVENTOR
James B. Doolittle
BY
Joshua Pusey,
ATTORNEY.

No. 637,450. Patented Nov. 21, 1899.
J. B. DOOLITTLE.
GASOLENE ENGINE.
(Application filed June 28, 1898.)
(No Model.) 5 Sheets—Sheet 2.
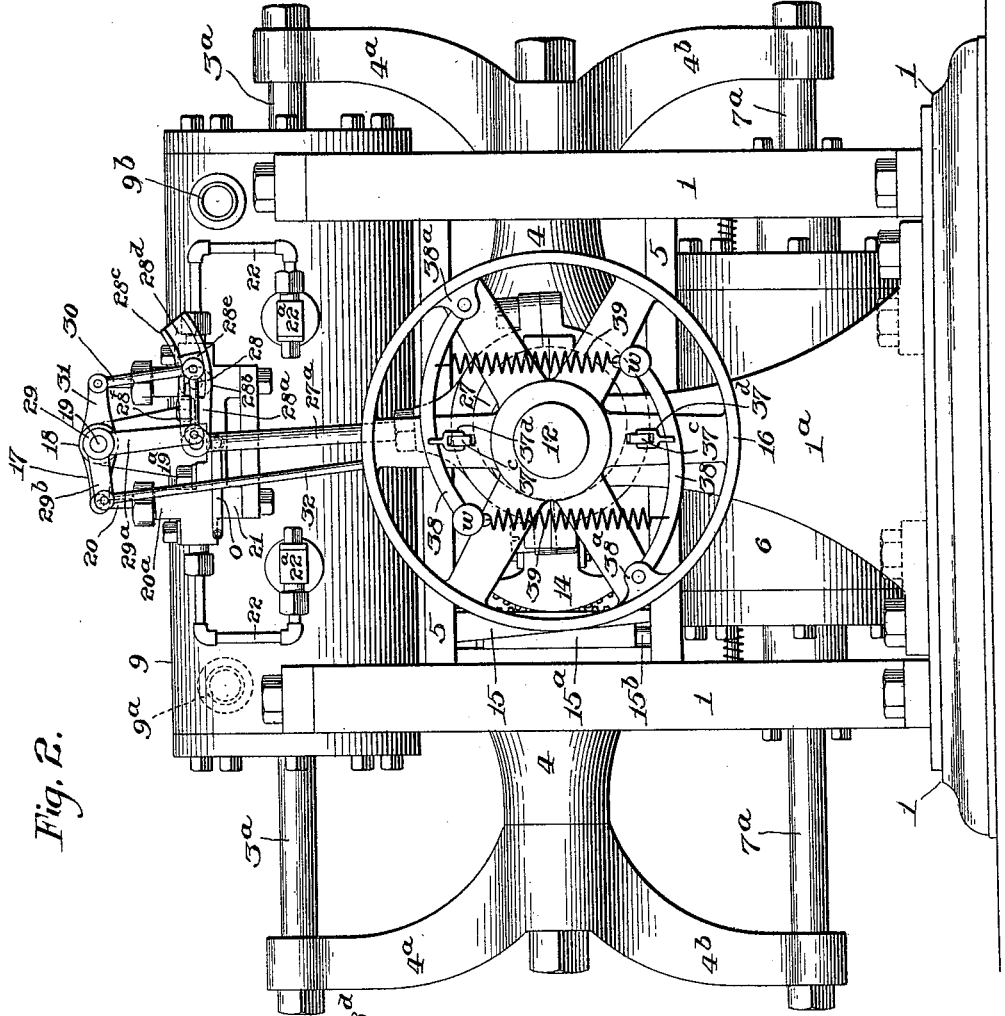
Fig. 2.
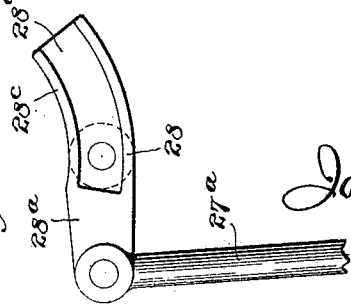
Fig. 2ª.
WITNESSES:
A. V. Groupe
Walter C. Pusey.
INVENTOR
James B. Doolittle
BY Joshua Pusey.
ATTORNEY.

No. 637,450. Patented Nov. 21, 1899.
J. B. DOOLITTLE.
GASOLENE ENGINE.
(Application filed June 28, 1898.)

(No Model.) 5 Sheets—Sheet 3.

WITNESSES:
A. V. Groupe
Walter C. Pusey.

INVENTOR
James B. Doolittle,
BY
Joshua Pusey,
ATTORNEY.

No. 637,450. Patented Nov. 21, 1899.
J. B. DOOLITTLE.
GASOLENE ENGINE.
(Application filed June 28, 1898.)
(No Model.) 5 Sheets—Sheet 4.
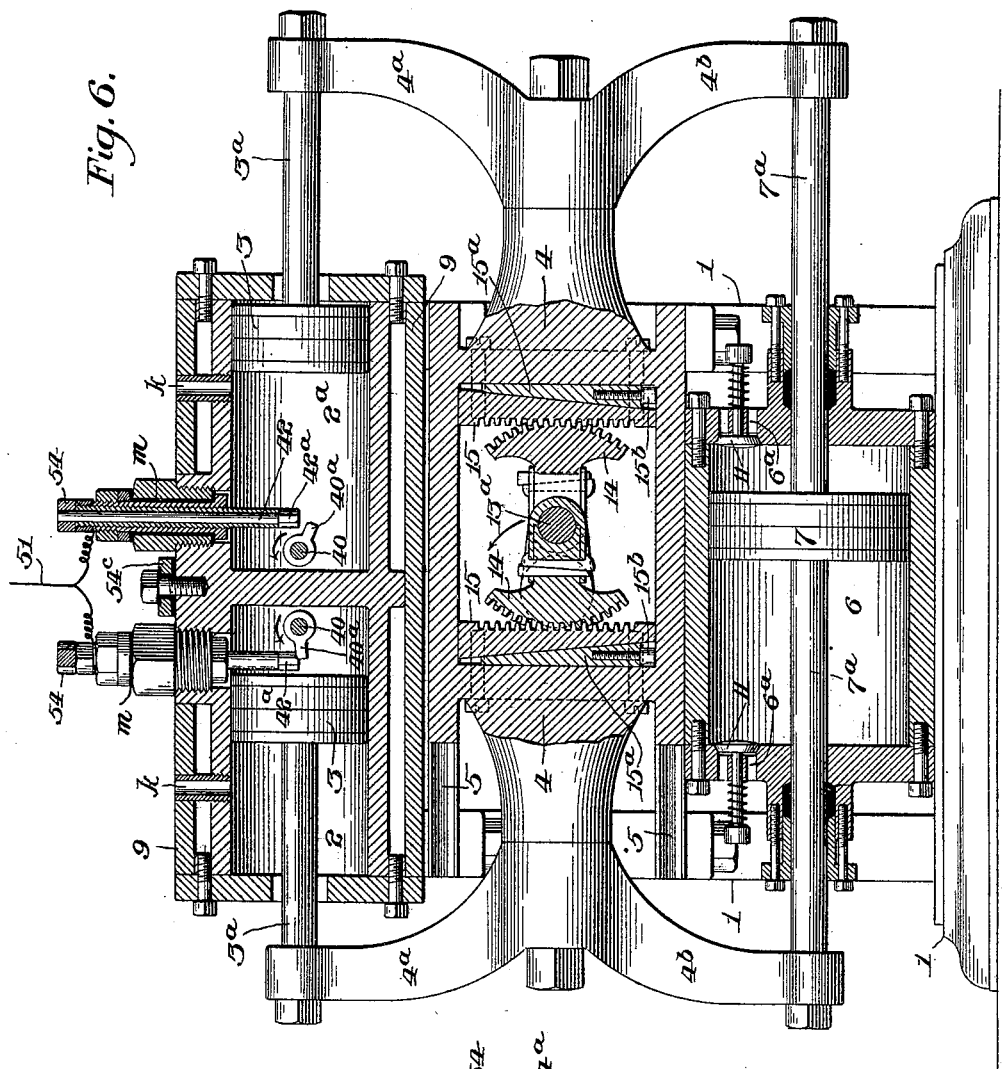
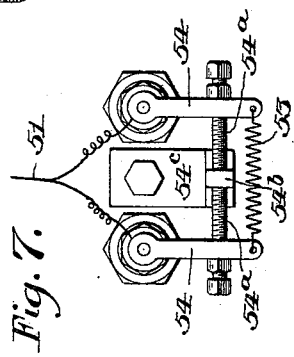
WITNESSES:
A. S. Groufer
Walter C. Pusey.
INVENTOR
James B. Doolittle,
BY Joshua Pusey,
ATTORNEY.

No. 637,450. Patented Nov. 21, 1899.
J. B. DOOLITTLE.
GASOLENE ENGINE.
(Application filed June 28, 1898.)
(No Model.) 5 Sheets—Sheet 5.

WITNESSES:
A. V. Groupe
Walter C. Pusey

INVENTOR
James B. Doolittle,
BY Joshua Pusey.
ATTORNEY.

UNITED STATES PATENT OFFICE.

JAMES B. DOOLITTLE, OF WALLINGFORD, CONNECTICUT, ASSIGNOR OF ONE-HALF TO ALFRED R. JUSTICE, OF PHILADELPHIA, PENNSYLVANIA.

GASOLENE-ENGINE.

SPECIFICATION forming part of Letters Patent No. 637,450, dated November 21, 1899.

Application filed June 28, 1898. Serial No. 684,659. (No model.)

*To all whom it may concern:*

Figure 1:
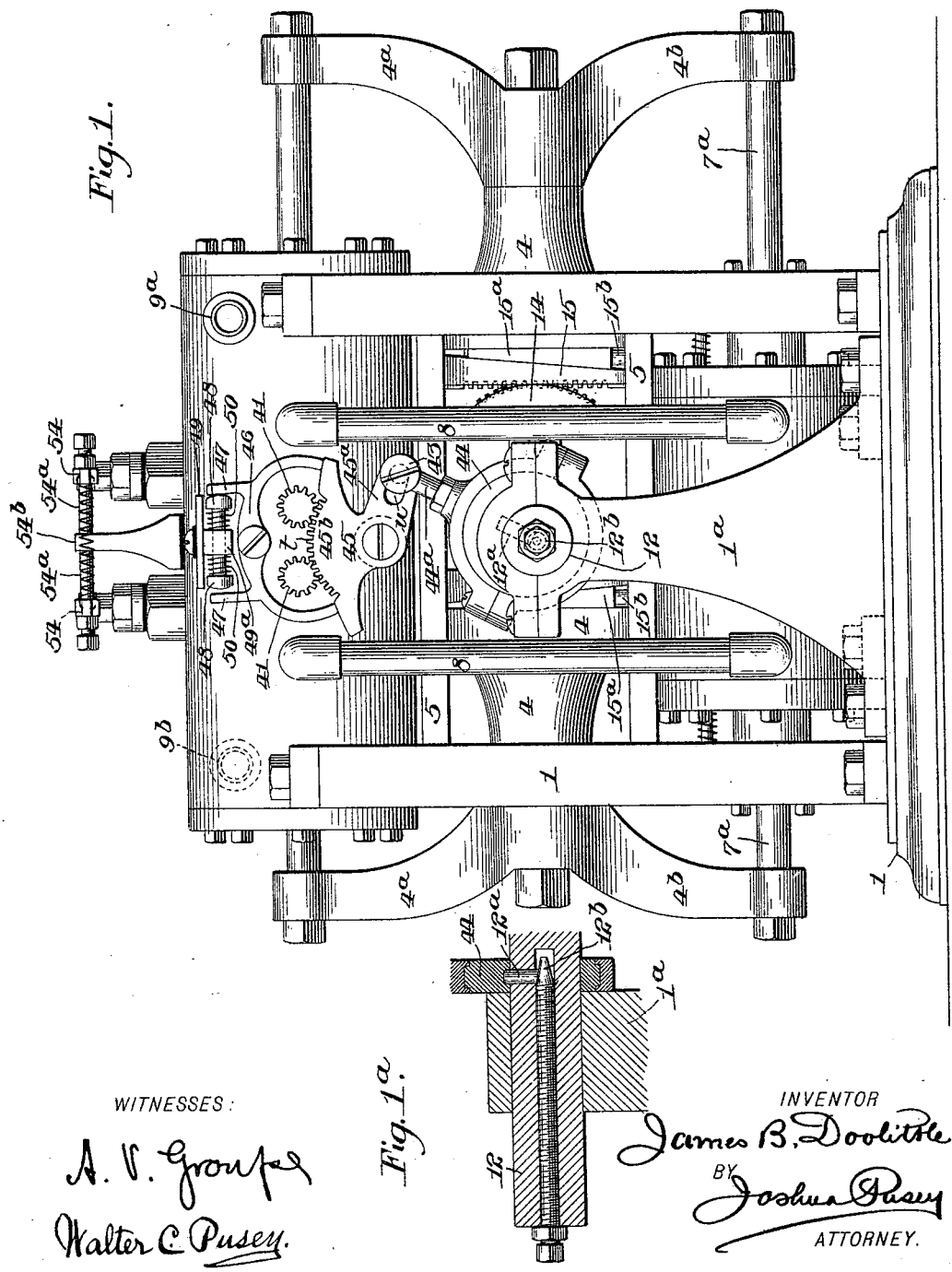
Figure 3:
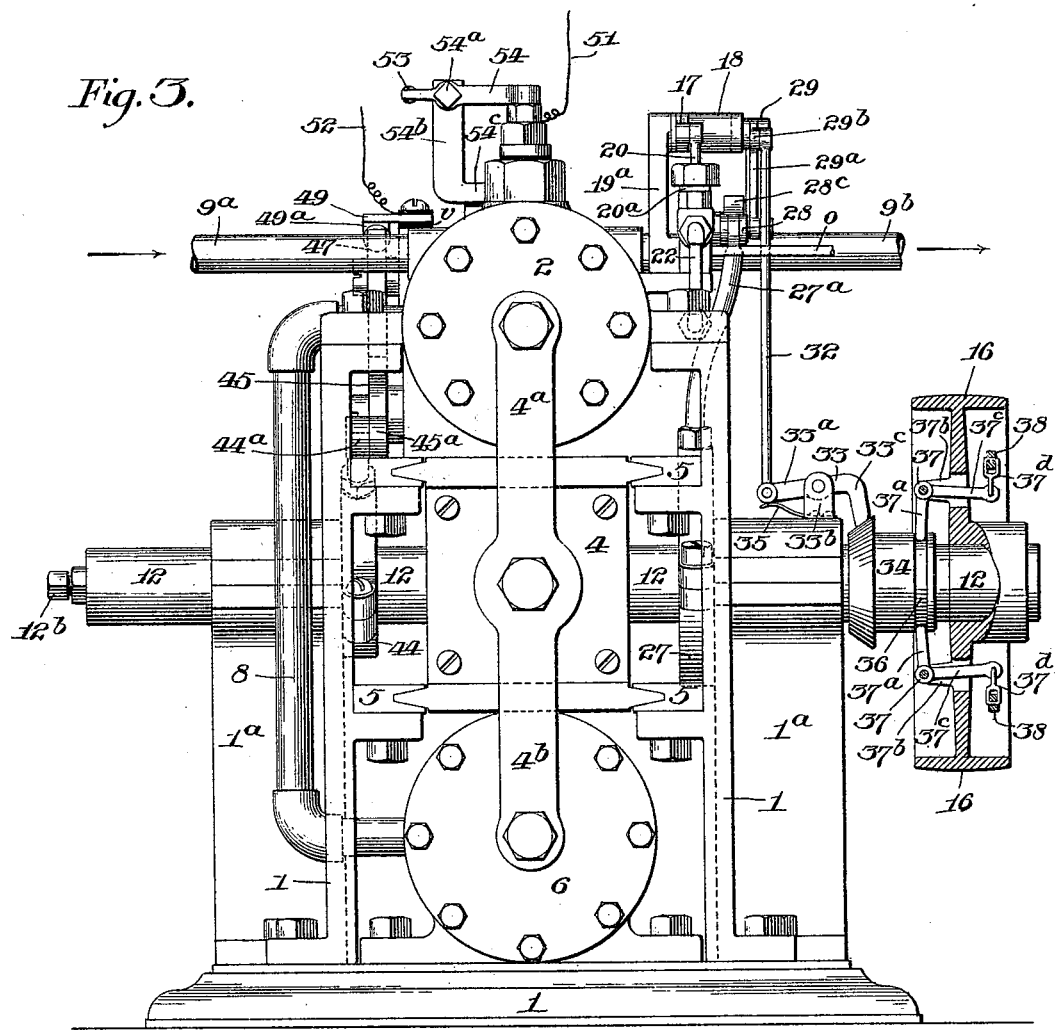
Figure 4:
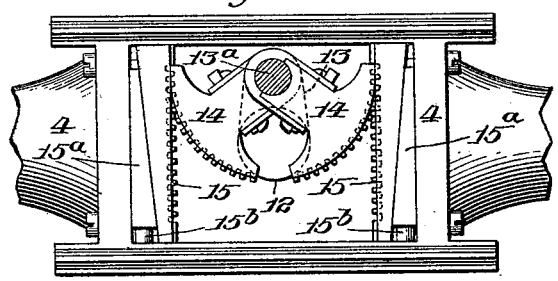
Figure 5:
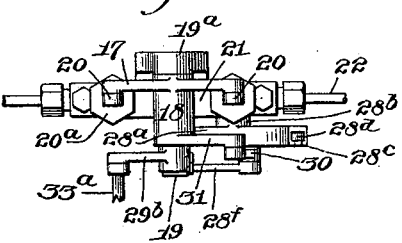
Figure 8:
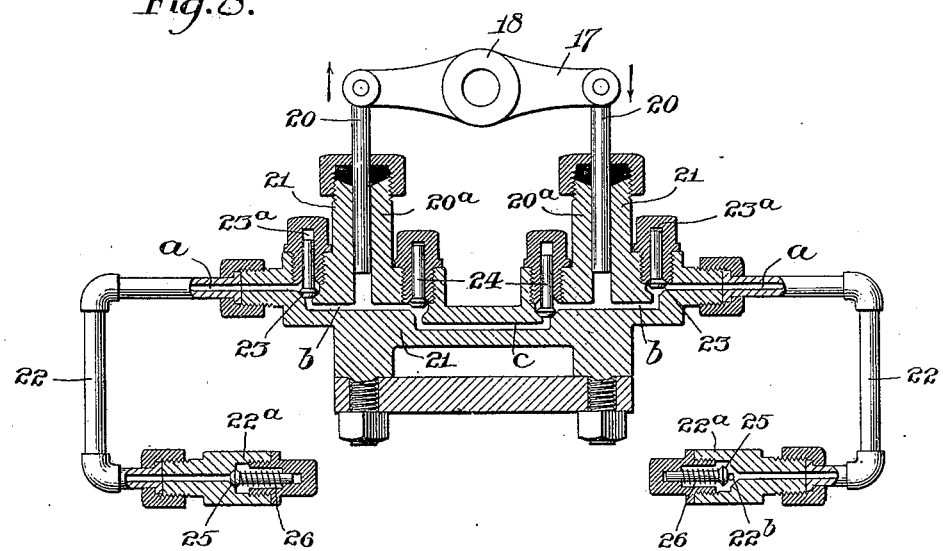
Figure 9:
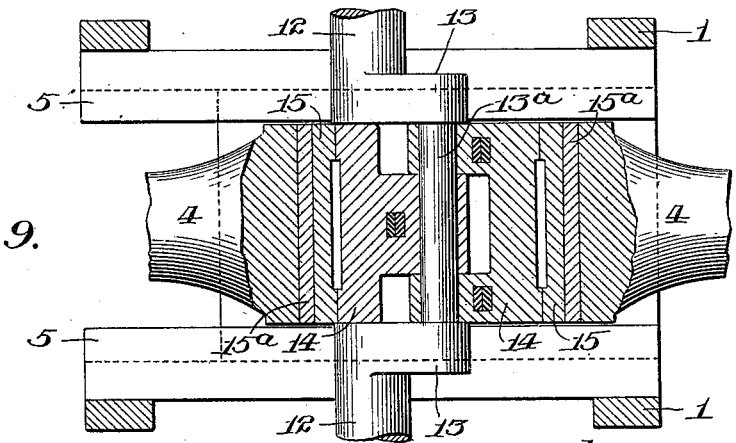
Figure 10:
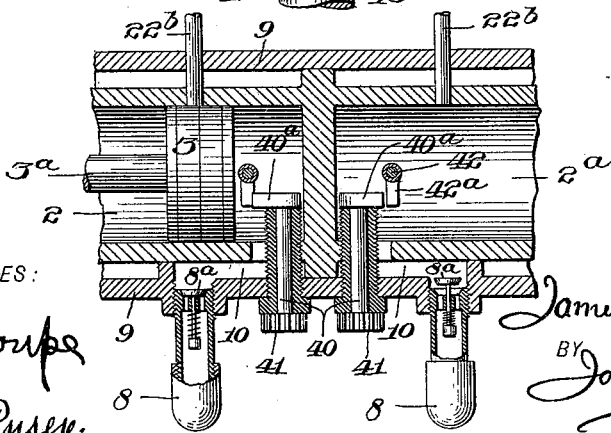

Be it known that I, JAMES B. DOOLITTLE, a citizen of the United States, residing at Wallingford, in the county of New Haven and State of Connecticut, have invented certain new and useful Improvements in Gasolene-Engines, of which the following is a full, clear, and exact description, reference being had to the accompanying drawings, of which—
Figure 1, Sheet 1, is a side elevation; Fig. 1ª, same sheet, a detail, being a longitudinal section of the devices for securing one of the eccentrics to its shaft; Fig. 2, Sheet 2, an elevation of the side opposite to that shown in Fig. 1; Fig. 2ª, same sheet, a detail of the curvilinear grooved arm and rod connecting the same with its operating-eccentric, being a part of the mechanism for regulating the throw of the gasolene-pumps; Fig. 3, Sheet 3, an end view of the engine. Fig. 4, same sheet, is a side elevation of part of the mechanism for converting the reciprocating motion of the pistons of the explosion-cylinders into rotary motion of the driving-shaft; Fig. 5, same sheet, a plan view of the gasolene-pump cylinders and a part of the mechanism for actuating the pistons therein and for regulating the throw of the latter. Fig. 6, Sheet 4, is a sectional side elevation of the engine, the section being medial; Fig. 7, same sheet, a detail in plan of the spring-controlled devices for maintaining the conductor-rods normally in proper relative position; Fig. 8, Sheet 5, an enlarged vertical section of the gasolene-pumps and connections detached from the machine. Fig. 9, same sheet, is a sectional plan, enlarged, of the aforesaid mechanism for converting reciprocating into rotary motion. Fig. 10, same sheet, is a horizontal section, enlarged, through the explosion cylinders and parts connected therewith.

This invention relates generally to that class of engines which are actuated by the force resulting from the explosion of a suitable mixture of air and gasolene or the like injected into the cylinders of the engine; and the invention relates more particularly to engines of the kind wherein the ignition of the gasolene or the explosion of the mixture is made by an electric spark.

The invention has for its object to provide a simple, efficient, convenient, and compact gasolene-engine adapted more especially for use in driving wheeled vehicles, boats, &c.

The precise nature of the invention and the improvements I have made in this class of engines will be hereinafter fully described and the features and combinations which I believe to be new particularly pointed out.

Referring to the accompanying drawings, forming a part of this specification, 1 is the framework of the engine, which is made as light, yet as strong and firm, as possible and by which all of the mechanism is supported. In the upper part of this frame are secured two similar hollow cylinders 2 2ª, hereinafter termed the "explosion-cylinders." In the present instance, for economy, strength, and compactness, the said cylinders are, in fact, one cylinder divided into two by means of a central partition, as seen in Figs. 6 and 10. In each of the cylinders is adapted to work a piston 3, the end of whose rod 3ª, that projects through the cylinder-head, is secured to the end of the upper limb 4ª of a part 4, (which I shall hereinafter term the "yoke-slide,") that is adapted to reciprocate longitudinally in suitable guideways 5, projecting from the inner side of a part of the main frame. It is in these cylinders that the explosions of the mingled gasolene vapor and air take place alternately, induced by an electric spark, and whereby said yoke-slide is caused to forcibly reciprocate, as hereinafter described. In the lower part of the frame, immediately beneath the line of the yoke-slide, is a third cylinder 6, hereinafter termed the "air-cylinder," which is made of suitable diameter with relation to that of the explosion-cylinders. A piston 7, adapted to work in the said cylinder, is connected by a rod or rods 7ª to the lower limbs 4ᵇ of the yoke-slide. Pipes 8 communicate between the end portions of the cylinder—that is, one at each side of the piston—with the explosion-cylinders, respectively. In the present instance there is a hollow casing or jacket 9 around the latter cylinders, through which cold water is allowed to circulate by way of an inlet-pipe 9ª and an outlet-pipe 9ᵇ, and there is a passage-way 10, Fig. 10, Sheet 5, cut off from the remainder of the casing and opening into the explosion-cylinders. The air-pipe is entered into the outer wall of said passage-way, and at the point of entrance is a spring-controlled normally-closed check-valve 8ª, Fig. 10, for preventing the exit, by way of said pipe, of the gases at the time of the explosion occurring in the cylinders 2 2ª.

Each end of the air-cylinder is provided with an opening 6ª, Fig. 6, for the ingress of air at each reciprocation of the piston 7, which openings are kept normally closed by means of spring-controlled valves 11, whereby while the air enters on the receding side of the piston it is prevented from escaping through the opening on the advancing side.

As hereinafter described, the explosions occurring in the cylinders 2 2ª alternately cause the reciprocation of the pistons in the latter and the piston in the air-cylinder, and consequently, by reason of the foregoing-described connections, of the said yoke-slide 4. As it is, however, desirable in a machine of this kind to convert such alternating reciprocatory motion into a continuous rotary motion, I employ suitable mechanism to that end.

The mechanism which I prefer to employ is an adaptation of that described and shown in Letters Patent of the United States No. 139,499, granted to me on the 3d day of June, 1873, for a mechanical movement, and is as follows: Extending transversely to and substantially midway between the explosion and air cylinders is a shaft 12, hereinafter termed the "main" shaft, that is journaled in bearings of uprights 1ª, rising from the base of the main frame. The shaft is made in two similar parts, with a crank 13 on the inner end thereof, the two cranks being connected by a pin 13ª, that spans across the open or middle portion of the yoke-slide 4, as seen in Fig. 9, Sheet 5. Pivoted to the said pin and extending on opposite sides thereof are two crank-segments 14, whose outer ends are in the arc of a circle concentric with the crank-pin. These ends, respectively, are so arranged, as seen in Figs. 4 and 6, as to ride against vertical end abutments 15 of the said middle portion of the yoke-slide, and in order to always maintain the segments in proper relative position I provide the same with teeth which are adapted to interdigitate with the teeth of the said abutments, as seen in Figs. 4 and 6. In order to adjust the latter to take up wear or otherwise, I make them separate from the yoke-slide and longitudinally movable and effect their adjustment by means of inclined keys 15ª, that are in contact with the correspondingly-inclined ends of the abutment, these keys being adjusted by means of screws 15ᵇ, whose heads bear upon the bottom of the yoke-slide, as seen in Figs. 4 and 6. The reciprocations of the yoke-slide cause the crank-segments to impart a continuous rotary motion to the shaft, owing to connection of the segments with the crank-pin 13ª, as described in my said Letters Patent.

In Fig. 6 the segments are on the dead-center, and in Fig. 4 they are at an angle to each other, as when driving the shaft. The power imparted to the latter may be conveyed to a second shaft by means of a belt from a pulley 16, Figs. 2 and 3, on the end of the shaft 12.

The required quantity of gasolene is supplied to the explosion-cylinders alternately at the proper times by the following pump mechanism: 17 is a walking-beam that is secured to a sleeve 18, which is mounted upon a horizontally-extending stud 19 of a support 19ª, connected to the main frame. Pivoted to the ends, respectively, of the said beams are pump-pistons 20, that are adapted to work in cylinders 20ª of a head or frame piece 21, which is mounted on the main frame. There is a continuous passage-way $a$, $b$, and $c$ in the piece 21, that communicates with the pump-cylinders and also with lateral pipes 22, that lead, respectively, into the explosion-cylinders at a suitable point—that is, about midway of the length of the latter. The portions $b$ of the said passage-way are below the line of the portions $a$, and the portion $c$ is below that of $b$, as seen in Fig. 8, Sheet 5. Where the part $a$ meets the upturned end of $b$ is a valve 23, adapted to work in a guideway 23ª, the conical lower end of the valve normally seating itself by gravity in a corresponding face or socket at the junction of the passage-way portions $a$ and $b$. There are also similar valves 24 and sockets at the junction of the portions $b$ and $c$. The ends of the pipes 22 are respectively connected to chambered blocks 22ª, having pipes or passage-ways 22ᵇ, Figs. 8 and 10, that lead into the respective explosion-cylinders. In the enlarged part of the chamber of each block is a horizontally-disposed valve 25, whose conical end is normally maintained by a compression-spring 26, seated in a corresponding socket at the end of the passage-way or narrow part of said chamber, which is a continuation of the pipe 22.

The pump is operated through the medium of an eccentric 27 on the main shaft, the upper end of the eccentric-rod 27ª being pivoted to the arm 28ª of a rock-lever 28, that is itself pivoted on a stud 28ᵇ, projecting from the frame-piece 21. The other or outer arm 28ᶜ of the said lever is provided with a curvilinear groove 28ᵈ, Fig. 2, in which is entered a head or block 28ᵉ upon the outer end of an arm 28ᶠ, whose other end is pivoted to the depending arm 29ª of a bell-crank lever 29, that is mounted on a reduced end portion of the sleeve 18 of the aforesaid walking-beam, as seen in Figs. 2, 3, and 5. Pivotally connected to the block 28ᵉ of the rod 28ᶠ is a rod 30, whose upper end is pivoted to the end of an arm 31, that is secured to the walking-beam sleeve, and pivoted to the other or horizontal arm 29ᵇ of the bell-crank 29 is a rod 32. The lower end of this rod is pivotally connected to the inner arm 33ª of a rock-lever 33, (seen only in Fig. 3,) which is pivoted to a lug 33ᵇ on the box of the main shaft. The other arm 33ᶜ of this lever is bent downwardly and its free end is beveled and bears against the correspondingly-tapering periphery of a sleeve 34 on the main shaft, to which latter it is connected by a spline-and-groove connection, (not shown,) so that it (the sleeve) will rotate with the shaft. The end of the lever-arm $33^c$ is maintained against the taper of the sleeve by means of a suitable spring—as, for example, a flat spring 35—one end of which is fastened to the box of the shaft and the other end bears against the under side of the lever-arm $33^a$, as seen in Fig. 3. The outer end of the sleeve has a circular groove 36, in which are entered the opposite arms $37^a$ of bell-crank levers 37, which are pivoted to lugs $37^b$, extending from spokes of the hereinbefore-mentioned pulley 16 upon the end of the shaft. The other or horizontal arms $37^c$ of the levers 37 pass through apertures in said spokes, and their ends are pivotally connected by links $37^d$ to arms or levers 38, Figs. 2 and 3, whose outer ends are pivoted to lugs $38^a$ on the inner face of the pulley. These levers are drawn normally toward each other by means of helical springs 39, one of which is connected to the free end of the lever 38 and the other end to the opposite lever at a suitable distance from its pivot, as clearly seen in Fig. 2. I usually provide a weight $w$ on the free end of each of said levers 38.

In practice I would usually employ means to regulate or adjust the effective tension or action of the springs; but such means are within the knowledge or skill of the mechanic and so I have not deemed it necessary to illustrate the same.

The gasolene is admitted to the pumps by way of a pipe $o$, leading from a tank (not shown) containing gasolene into the part $c$ of the before-described passage-way $a\ b\ c$.

It will be seen that by the described mechanism the extent of the throw of the pump-pistons 20, and consequently the quantity of gasolene injected into the explosion-cylinders alternately at each downward stroke of the piston, will be governed by the speed of rotation of the main shaft and its pulley, and thus a substantial uniformity in the operation of the engine will be maintained, for as the speed increases or diminishes the levers 38 will, according to the centrifugal force developed by the speed of the rotating shaft, move out or in against the stress of the springs 39. Through the described connections between these levers and the sleeve 34 the latter will slide in or out upon the shaft, as the case may be, thus causing the tapering end of the sleeve to impart a corresponding movement or throw of the connecting-rod 32, and consequently of the bell-crank 29, and thus of the rod $28^f$, the block $28^e$ upon which sliding in the groove $28^d$ of the arm $28^c$ of the pivoted lever 28, to which, it will be remembered, the eccentric-rod $27^a$ is connected. As the rod 30 connects the arm 31 of the walking-beam sleeve with the rod $28^f$, it will be obvious that the extent of rock of the said sleeve, and consequently of the walking-beam and pump-pistons, will be greater or less, according to the distance of the block $28^e$ from the fulcrum of the grooved lever 28, and thus the quantity of the gasolene pumped into the cylinders will vary according to the speed of rotation of the shaft and its pulley.

The devices for causing ignition of the gasolene thus forced into the cylinder or, more accurately, for causing the explosion of the mixed gasolene vapor and air within the explosion-cylinders is as follows: Journaled in bearings respectively on the sides of the said cylinders are two shafts 40, that extend into the interior of the latter. On the outer ends of each of the shafts is a pinion-gear 41, and on the inner ends of each shaft is an arm or projection $40^a$, whose free end is adapted, at predetermined times, to make and break contact with the side of a similar arm or projection $42^a$ of an electrical conductor-rod 42, that extends through the top of the explosion-cylinder, as hereinafter described. A suitable oscillatory movement is imparted to the shafts 40 alternately (in opposite directions) in order to bring the shaft projections $40^a$ into and out of contact with the projections $42^a$ of the conductor-rods at the proper instants by means of an eccentric 44, whose rod $44^a$ is pivotally connected to an arm $45^a$ of a rock-lever 45, that is pivoted on a stud extending from the side of the cylinders and whose upper arm $45^b$ has a segmental part with teeth $t$, that engage with the teeth of the two pinions 41. The extent of rocking given to the lever 45 may be regulated by means of an adjusting set-screw or bolt 43 on the eccentric-rod $44^a$, which bolt passes through a slot $u$ in the arm $45^a$ of the said lever. Pivoted also on a stud of the side of the cylinders above the lever 45 is a yoke 46, whose two limbs project downwardly and bear, respectively, upon the top of the arm $45^b$ beyond the toothed segmental part of the latter, as seen in Fig. 1. Each limb of the said yoke has an upwardly-projecting finger 47, between the free ends of which is a horizontal bar 48, that is adapted to slide longitudinally in the depending limb $49^a$ of a bracket 49, that is secured to the side of the explosion-cylinders, and which bracket is electrically insulated by means of suitable material $v$, interposed between the bracket and its connections with the cylinder. On each side of the bracket-limb upon the bar 48 is a compressible spring 50, the two having substantially the same resistance, one end of which bears against an enlargement on the end of the bar and the other end against the bracket-limbs $49^a$.

It will be obvious that when the segment-lever 45 is rocked by the action of the eccentric 44 in the rotation of the main shaft the yoke-fingers 47 will alternately contact with the ends or heads of the sliding bar 48, while the other finger will be out of contact with the head or end adjacent thereto, as seen in Fig. 1.

As a convenient means for securing the eccentric 44 upon the main shaft I employ the device shown in Fig. 1ª. This consists of a pin 12ª in a transverse aperture in the shaft and a conical end screw or bolt 12ᵇ, entered into a longitudinal hole in the shaft which extends past the pin-aperture. The eccentric has a socket in which the pin is adapted to enter. The eccentric having been slid onto the shaft and the pin-socket brought into registry with the pin, the screw 12ᵇ is advanced, and its conical end impinging against the end of the pin forces its other end into the said socket, as seen in the said figure.

The conductor-rods 42 are insulated from the cylinders by means of suitable material $m$, interposed between the connections of the rods with the explosion-cylinders. A conductor-wire 51 connects the rods with one of the poles of a source of electrical energy, and another wire 52 connects the aforesaid bracket 49, and consequently the shafts 40, with the other electrical pole. The said rods 42 are maintained yieldingly in position, so that the projections 42ª thereof will be normally in the proper position with relation to the projections 40ª of the shafts 40 by means of a spring 53, Figs. 1 and 7, connecting the free ends of arms 54, that project horizontally from the upper ends of the conductor-rods, each of the said arms also carrying an adjusting set-screw 54ª, whose inner ends abut against a stop-lug 54ᵇ of a bar 54ᶜ, that is secured to and projects horizontally from the top of the explosion-cylinders.

Having described the construction of my invention, I shall proceed to describe the mode of operation thereof.

Assuming that the parts are now in the positions shown in Fig. 6, wherein the piston of the explosion-cylinder 2ª to the right has reached the limit of its outward stroke and of the cylinder 2 on the left the limit of its inward stroke, the space between the latter piston and the adjacent head of the cylinder being then occupied by the mixed air and gasolene previously forced therein, the projection 40ª of the shaft 40 on that side being in contact with the projection 42ª of the corresponding conductor-rod 42 and one of the fingers 47 of the sliding bar 48 being in contact with the end of the latter, (see Fig. 1,) and thus the electrical current through the conductor-rod and said shaft 40 being closed. Now, as the main shaft 12 continues its rotation shaft 40, (on the left,) will be rotated, in the direction of the arrow in Fig. 6, by the action of the eccentric 44, the rock-lever 45, with its toothed segment, that engages the pinion of shaft 40. As the projection 40ª of the latter, on the left, breaks contact with the projection 42ª of the conductor-rod the electrical spark is made, which ignites the gasolene and explodes the gaseous mixture in the said cylinder 2. The force of the explosion drives back the piston, and the piston 7 of the air-cylinder similarly advances. The air compressed by said piston passes into the explosion-cylinder immediately after the explosion and forces the products of combustion out of the cylinder when the piston has passed beyond a vent-outlet $k$ with which that cylinder, as also cylinder 2ª, is provided. As the said piston on the left moves outwardly the other piston on the right moves inwardly, and at about the time it has passed the outlet $k$ in that cylinder a piston of the gasolene-pump is caused to descend through the operation of eccentric 27 and the intervening mechanism hereinbefore fully described and forces a certain quantity of the gasolene into the explosion-cylinder 2ª. As the main shaft, &c., continues its rotation and the cylinder-piston 3 on the right, Fig. 6, advances the shaft 40 on that side is first rotated in the direction of the arrow in said figure—that is, upwardly—and the free end of its projection 40ª impinges or slides against the side of the projection 42ª of the conductor-rod 42. Meanwhile the yoke 46 has been rocked by its described actuating mechanism, and at the instant the projections 40ª and 42ª first come into contact with each other the fingers 47 are in a midway position, wherein both of them are out of contact with the bar 48, and thus danger is avoided of "sparking" when the said projections come into contact and so igniting the gasolene at the wrong moment, for the electrical circuit could not at that moment be completed. When the piston 3 on the right of Fig. 6 has reached the same relative position as the one to the left, a finger of the said yoke 46 having been brought into contact with the end of bar 48, the shaft 40 is oscillated downwardly out of contact with the conductor-rod, thus breaking the circuit as the projection 40ª leaves the projection 42ª, and so causes a spark at that point which ignites the gasolene, as was done in the other cylinder when its piston, &c., was in the similar position. These operations alternate in continuous succession. The conductor 42 being spring-controlled, as hereinbefore described, are adapted to yield relatively in one direction, and thus the proper contact of the projections of the rods and of the shafts 40 is insured. By suitably turning the set-screws 54ª, Fig. 7, the lateral position of the projections of the conductor-rods may be adjusted as may be required.

I remark that while I have shown and described that form and construction in detail of my invention which at the present time I believe to be most desirable the parts may be considerably modified by those skilled in the art without departing from the principle of the invention. I remark, further, that my invention is not limited to an engine of the character described in which gasolene is employed, as other similar or equivalent agents may be used in lieu thereof. The ignition devices above described will form the subject-matter of a separate application to be filed by me.

Having thus described my invention, what I claim as new, and desire to secure by Letters Patent, is—

1. In an engine of the nature described, the combination of the explosion-cylinders, the air-supplying cylinder communicating therewith, the pistons in said cylinders, respectively, the yoke-slide or the like, suitably connected with said pistons, the main shaft, means connecting said slide and shaft for converting the reciprocatory motion of the former into continuous rotary motion of the latter, means for injecting gasolene, or the like, into said explosion-cylinders alternately at suitable predetermined times, and means for causing ignition of the gasolene within the latter cylinders alternately, at predetermined times in the movements of the pistons therein, substantially as and for the purpose set forth.

2. In an engine of the nature recited, the combination of the explosion-cylinders, the air-supplying cylinder, communicating with the latter, the pistons in said cylinders, respectively, the main shaft, the yoke-slide or the like, suitably connected with said pistons, means connecting said slide and shaft for converting the reciprocatory motion of the former into continuous rotary motion of the latter, the pump for injecting gasolene, or the like, into said explosion-cylinders at suitable predetermined times, alternately, mechanism intervening between said pump and shaft for actuating the pump, and means for causing the ignition of the gasolene within said explosion-cylinders at predetermined times in the movements of the pistons therein, respectively, substantially as and for the purpose set forth.

3. In an engine of the nature recited, the combination of the explosion-cylinders, the air-supply cylinder communicating with the latter, the pistons in said cylinders, respectively, the yoke-slide or the like suitably connected with said pistons, the main shaft, mechanism connecting said slide and shaft for converting the reciprocatory motion of the former into continuous rotary motion of the latter, the pump for injecting gasolene, or the like, into said explosion-cylinders, alternately, at suitable predetermined times, and mechanism intervening between said pump and shaft whereby the extent of the throw of the pump is governed by centrifugal force from the rotation of said shaft, substantially as and for the purpose set forth.

4. In an engine of the nature recited, the combination of the explosion-cylinders, the air-supply cylinder communicating with the latter, the pistons in said cylinders, respectively, the yoke-slide or the like, connected with said pistons, the main shaft, means connecting said slide and shaft for converting the reciprocatory motion of the former into continuous rotary motion of the latter, the pump for injecting gasolene or the like having the pistons connected to the walking-beam, the rock-lever, 28, the eccentric upon the main shaft, its rod connected to one arm of said lever, the bell-crank lever, 29, connected with the walking-beam, the arm, 31, also connected with said beam, the rods, 28$^f$, and 30 connecting an arm of the bell-crank lever, and the said arm, 31, the part at the junction of said rods, entered and adapted to slide in the groove of the arm of the rock-lever, the lever, 33, the rod connecting said lever with the arm of said bell-crank lever, the pulley on said shaft, the spring-controlled arm, 38, pivoted to said pulley, and mechanism connecting said lever, 33, and said arm, 38, whereby the extent of the throw of the lever is varied by the movement of the spring-controlled arms, induced by centrifugal force, substantially as and for the purpose set forth.

5. In an engine of the nature recited, the combination of the explosion-cylinders, the air-cylinder, the pistons in said cylinders, respectively, the yoke-slide, or the like, connected with said pistons, the main shaft, mechanism connecting the latter and the said slide for converting the reciprocatory motion of the slide into continuous rotary motion of the shaft, means for injecting gasolene, or the like, into the explosion-cylinders at suitable predetermined times, means for causing the ignition of the gasolene at required times, consisting of the conductor-rods within said explosion-cylinders, respectively, and communicating with one pole of a source of electrical energy, the shafts also extending into the latter, respectively, and communicating with the other pole of said source of electrical energy, and having parts adapted to make and break contact with parts of said conductor-rods when the shafts are oscillated, and mechanism intervening between said shafts and the main shaft whereby the former are suitably oscillated at predetermined times, alternately, substantially as and for the purpose set forth.

6. In an engine of the nature recited, the combination of the explosion-cylinders, the air-supply cylinder, the pistons in said cylinders, respectively, the main shaft, the yoke-slide, or the like, connected with said pistons, mechanism connecting the latter and said slide for converting the reciprocatory motion of the slide into continuous rotary motion of the shaft, means for injecting gasolene, or the like, into the explosion-cylinders, alternately, at suitable predetermined times, the conductor-rods connected with one pole of a source of electrical energy, and extending into said explosion-cylinders, respectively, the oscillatory shafts also extending into said cylinders, respectively, said shafts being connected with the other pole of the source of electrical energy, and having also parts adapted to make and break contact with parts of said conductor-rods when said shafts are oscillated, mechanism intervening between said shafts and the main shaft whereby the former are suitably oscillated at predetermined times alternately, and means whereby the electrical current between said shafts and conductor-rods is closed and broken at predetermined times, substantially as and for the purpose set forth.

7. In an engine of the nature recited, the combination of the explosion-cylinders, the air-supply cylinder, the pistons in said cylinders, respectively, the yoke-slide, or the like, connected with said pistons, the main shaft, mechanism connecting the latter and the said slide for converting the reciprocatory motion of the slide into continuous rotary motion of the shaft, means for injecting gasolene, or the like, into the explosion-cylinders, at suitable predetermined times, the conductor-rods connected with one pole of a source of electrical energy, the slidable spring-controlled bar connected with the other electrical pole, the pivoted yoke, having the fingers adjacent to the ends respectively, of the latter, the oscillatory shafts extending into said explosion-cylinders, and having parts adapted to make and break contact with parts, of said conductor-rods, respectively, the pinions on said shafts, the rock-lever, having teeth engaging those of said pinions and upon which arm the said yoke is adapted to bear, and the eccentric upon the main shaft connected to said rock-lever, all constructed, arranged, and adapted to operate substantially as and for the purpose set forth.

In testimony whereof I have hereunto affixed my signature this 18th day of June, A. D. 1898.

JAMES B. DOOLITTLE.

Witnesses:
ELI MIX,
FRANK E. STODDARD.